(12) United States Patent  
Okamoto

(10) Patent No.: US 6,229,379 B1
(45) Date of Patent: May 8, 2001

(54) GENERATION OF NEGATIVE VOLTAGE USING REFERENCE VOLTAGE

(75) Inventor: Toshiharu Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/190,445

(22) Filed: Nov. 13, 1998

(30) Foreign Application Priority Data

Nov. 17, 1997 (JP) .................................................... 9-315255

(51) Int. Cl.⁷ .......................................................... G05F 1/10
(52) U.S. Cl. ............................................ 327/535; 327/538
(58) Field of Search ................................... 327/536, 537, 327/534, 535; 257/536, 537, 538

(56) References Cited

U.S. PATENT DOCUMENTS

| | | | |
|---|---|---|---|
| 4,471,290 | * 9/1984 | Yamaguchi | 323/374 |
| 5,113,088 | * 5/1992 | Yamamoto et al. | 327/536 |
| 5,355,014 | * 10/1994 | Rao et al. | 257/533 |
| 5,483,486 | * 1/1996 | Javanifard et al. | 365/185.17 |
| 5,553,295 | * 9/1996 | Pantelakis et al. | 395/750 |
| 5,554,873 | * 9/1996 | Erdeljac et al. | 257/380 |
| 5,640,118 | * 6/1997 | Drouot | 327/306 |
| 5,661,332 | * 8/1997 | Nakamura et al. | 257/536 |
| 5,670,907 | 9/1997 | Gorecki et al. | 327/535 |

FOREIGN PATENT DOCUMENTS

| | | |
|---|---|---|
| 57-113262 | 7/1982 | (JP) . |
| 57-199335 | 12/1982 | (JP) . |
| 63-166257 | 7/1988 | (JP) . |
| 1-218211 | 8/1989 | (JP) . |
| 1-233752 | 9/1989 | (JP) . |
| 4-146665 | 5/1992 | (JP) . |
| 7-78471 | 3/1995 | (JP) . |
| 7-273287 | 10/1995 | (JP) . |
| 9-51266 | 2/1997 | (JP) . |

* cited by examiner

Primary Examiner—Timothy P. Callahan
Assistant Examiner—Hai L. Nguyen
(74) Attorney, Agent, or Firm—Foley & Lardner

(57) ABSTRACT

In a negative voltage generating circuit, a reference voltage generating circuit generates a first reference voltage. A voltage dividing circuit divides a voltage between the first reference voltage and a negative voltage to produce a division voltage. A comparing circuit compares a second reference voltage and the division voltage. A negative voltage generating section generates the negative voltage based on the comparing result by the comparing circuit to supply to the voltage dividing circuit. A potential corresponding to the division voltage is equal to the ground potential when the negative voltage is equal to a desired value.

11 Claims, 14 Drawing Sheets

GENERATION OF NEGATIVE VOLTAGE USING REFERENCE VOLTAGE

BACKGROUND OF THE INVENTION

1. Field of the Invention

The present invention relates to a negative voltage generating circuit, which is provided on a same chip as another semiconductor circuit such as a flash memory to generate and output a negative voltage.

2. Description of the Related Art

A negative voltage is typically used to erase a content stored in a flash memory. However, a voltage supplied to the flash memory is typical a positive voltage, and the negative voltage is not supplied. Thus, a negative voltage generating circuit is provided on the same chip as the flash memory and is used to generate the negative voltage.

FIG. 1 is a block diagram showing the structure of a conventional negative voltage generating circuit. The conventional negative voltage generating circuit will be described with reference to FIG. 1.

This conventional negative voltage generating circuit is composed of a voltage dividing circuit 82, a comparing circuit 3, an oscillator 4, a clock buffer 5, a negative voltage charge pump 6.

The voltage dividing circuit 82 divides a voltage between a negative voltage 104 and a power supply voltage Vcc to output a divided voltage 102. The comparing circuit 3 compares a voltage value of a reference voltage 120 with a voltage value of the divided voltage 102. The comparing circuit 3 sets an oscillator control signal 103 to an active state when the voltage value of the divided voltage 102 is equal to or higher than that of the reference voltage 120, and sets the oscillator control signal 103 to an inactive state when the voltage value of the divided voltage 102 is lower than that of the reference voltage 120.

A specific structure of the comparing circuit 3 will be described with reference to FIG. 2. Referring to FIG. 2, the comparing circuit 3 is composed of a resistor 97, P-channel MOS transistors 91 and 92 of a current mirror circuit, a P-channel MOS transistor 93 whose gate receives the reference voltage 120, a P-channel MOS transistor 94 whose gate receives the divided voltage 102, N-channel MOS transistors 95 and 96 of a current mirror circuit and an inverter 98.

In the P-channel MOS transistor 91, a current determined based on the property thereof and the resistor 97 flows between a source and a drain of the transistor 91. The current having the same current value as that flowing through the transistor 91 flows between a source and a drain of the P-channel MOS transistor 92, which constitutes the current mirror together with the P-channel MOS transistor 91. In this way, the P-channel MOS transistor 92 functions as a current source that supplies the current to the P-channel MOS transistors 93 and 94. The N-channel MOS transistors 95 and 96 constituting the current mirror circuit are respectively connected to the P-channel MOS transistors 93 and 94 as the loads thereto.

When the voltage value of the divided voltage 102 is equal to or higher than that of the reference voltage 120, the current flowing between a source and a drain of the P-channel MOS transistor 94 is decreased. When the divided voltage 102 is lower than the reference voltage 120, the current flowing between the source and the drain of the P-channel MOS transistor 94 is increased. As a result, when the divided voltage 102 is equal to or higher than the reference voltage 120, a voltage outputted to the inverter 98 is decreased. When the divided voltage 102 is lower than the reference voltage 120, the voltage outputted to the inverter 98 is increased. In this way, the voltage supplied to the inverter 98 is changed in a range of a certain amplitude, in accordance with whether the divided voltage 102 is higher or lower than the reference voltage 120. Thus, when a logical threshold of the inverter 98 is set to a value within the amplitude, the oscillator control signal 103 can be generated to indicate whether the divided voltage 102 is higher or lower than the reference voltage 120.

The oscillator 4 generates and outputs two oscillator output signals 105 and 106 whose phases become opposite to each other, when the oscillator control signal 103 is in the active state. A specific structure of the oscillator 4 will be described with reference to FIG. 3.

As shown in FIG. 3, the oscillator 4 is a ring oscillator composed of a NAND circuit 110 and inverters $111_1$ to $111_6$.

The NAND circuit 110 is provided in a loop of this ring oscillator. The oscillator control signal 103 is supplied to one input terminal of the NAND circuit 110. Thus, the oscillator control signal 103 is used to stop the operation of the oscillator 4, when the oscillator control signal 103 is in the inactive state of a low level. The inverters $111_1$ to $111_6$ are connected in series in the form of a ring. An output of the inverter $111_6$ is outputted as an oscillator output signal 105, and an output of the inverter $111_5$ is outputted as an oscillator output signal 106.

FIGS. 4A to 4C are timing charts showing operations of the oscillator control signal 103 and the oscillator output signals 105 and 106. Referring to FIG. 4A to 4C, it could be understood that when the oscillator control signal 103 is in the active state of a high level, Vcc, the two oscillator output signals 105 and 106 whose phases are opposite to each other are outputted, and when the oscillator control signal 103 is in the inactive state of a low level, GND, the oscillator output signals 105 and 106 are not outputted.

As shown in FIG. 5, the clock buffer 5 receives the oscillator output signals 105 and 106 outputted from the oscillator 4, and then outputs as complementary pulse signals 107 and 108 though inverters 121 and 122 and inverters 123 and 124, respectively.

The negative voltage charge pump 6 generates and outputs the negative voltage 104 from the complementary pulse signals 107 and 108. A specific structure of the negative voltage charge pump 6 will be described with reference to FIG. 6.

As shown in FIG. 6, the negative voltage charge pump 6 is composed of P-channel MOS transistors $131_1$ to $131_6$, capacitors $132_1$, to $132_6$ and a P-channel MOS transistor 133. The P-channel MOS transistors $131_1$, to $131_6$ are connected in series such that a gate and a source of each P-channel MOS transistor are connected to each other and further a source of one transistor and a drain of another transistor are connected to each other between the transistors adjacent to each other.

The drains of the P-channel MOS transistors $131_1$, $131_3$ and $131_5$ are connected to the complementary pulse signal 107 through the capacitors $132_1$, $132_3$ and $132_5$, respectively. Also, the drains of the P-channel MOS transistors $131_2$, $131_4$ and $131_6$ are connected to the complementary pulse signal 108 through the capacitors $132_2$, $132_4$ and $132_6$, respectively. The source of the P-channel MOS transistor $131_1$ is outputted as the negative voltage 104, and the drain of the P-channel MOS transistor $131_6$ is connected to the source of the P-channel MOS transistor 133. The gate and drain of the P-channel MOS transistor 133 are connected to the ground to set the drain of the P-channel MOS transistor 131$_6$ to a ground potential.

An operation of the negative voltage charge pump 6 will be described below. For the purpose of simple explanation, the operation will be described by using only the P-channel MOS transistor 131$_2$. However, the operations of the other P-channel MOS transistors 131$_1$, 131$_3$ to 131$_6$ are similar to those of the P-channel MOS transistor 131$_2$. For the purpose of explanation, the source of the P-channel MOS transistor 131$_2$ is assumed to be a node 13$a$, and the drain thereof is assumed to be a node 13$b$.

At first, it is assumed that at a certain timing, the complementary pulse signal 107 is set to the power supply voltage Vcc and the complementary pulse signal 108 is set to the ground potential. In this case, since the node 13$a$ is raised by the capacitor 132$_1$, the potential of the node 13$a$ is set to the high level. Also, since the node 13$b$ is lowered by the capacitor 132$_2$, the potential of the node 13$b$ is set to the low level. When the potential difference between the node 13$a$ and the node 13$b$ is equal to or greater than a threshold, the P-channel MOS transistor 131$_2$ is in an ON state. At this time, he charges of the node 13$a$ flow into the node 13$b$ whose potential is in the low level. As the charges are decreased at the node 13$a$, the potential is made lower. Also, as the charges are increased at the node 13$b$, the potential is made higher. Then, the movement of the charges is continued until the potential of the node 13$a$ becomes equal to that of the node 13$b$.

At a next timing, the complementary pulse signal 107 is set to the ground potential, and the complementary pulse signal 108 is set to the power supply voltage Vcc. In this case, since the node 13$a$ is decreased to the low level by the capacitor 132$_1$, the potential of the node 13$a$ is set to the low level. Also, since the node 13$b$ is raised by the capacitor 132$_2$, the potential of the node 13$b$ is set to the high level. Even if the potential of the node 13$b$ is increased to high level, the gate and the drain maintain the same potential because the gate and the drain are connected to each other. Thus, the P-channel MOS transistor 131$_2$ remains in the OFF state. However, the above mentioned movement of the charges is performed in the P-channel MOS transistors 131$_1$ and 131$_3$ which are adjacent to the P-channel MOS transistor 131$_2$.

The complementary pulse signals 107 and 108 are alternately switched between the power supply potential level and the ground potential level, and further the P-channel MOS transistors 131$_1$, to 131$_6$ repeat the above mentioned operation. Accordingly, the charges are sequentially transferred in the direction from the P-channel MOS transistor 131$_1$ to the P-channel MOS transistor 131$_6$. The source of the P-channel MOS transistor 131$_1$ is set to the lowest potential in the negative voltage charge pump 6, and outputted as the negative voltage 104.

The operation of the conventional negative voltage generating circuit will be described below with reference to FIG. 1.

If the negative voltage 104 is higher than a desired voltage value, the divided voltage 102 is higher than the reference voltage 120. Thus, the comparing circuit 3 sets the oscillator control signal 103 to the active state. The oscillator 4 generates and outputs the oscillator output signals 105 and 106 in response to the active oscillator control signal 103. Then, the clock buffer 5 receives the oscillator output signals 105 and 106, and then outputs the complementary pulse signals 107 and 108. For this reason, the negative voltage charge pump 6 functions to decrease the voltage value of the negative voltage 104.

When the negative voltage 104 reaches the desired voltage so that the divided voltage 102 outputted from the voltage dividing circuit 82 becomes equal to the reference voltage 120, the oscillator 4 does not output the oscillator output signals 105 and 106, because the comparing circuit 3 sets the oscillator control signal 103 to inactive state. The negative voltage charge pump 6 stops the operation in response to the inactive oscillator control signal 103. Also, the voltage value of the negative voltage 104 remains in the defined voltage value.

The thus-generated negative voltage 104 is used to erase the content stored in the flash memory. However, another problem occurs that as the negative voltage 104 is made higher, the erasing time in a memory cell is increased longer. On the other hand, when the negative voltage 104 is made lower, the erasing time becomes shorter. However, another problem occurs of reliability, such as a deterioration of a data retaining property of the memory cell. The optimal voltage value becomes a limited voltage value, in view of these conditions. Hence, the optimal operation for the flash memory requires that the voltage value of the negative voltage 104 has a high accuracy.

In the conventional negative voltage generating circuit, the power supply voltage Vcc and the negative voltage 104 are divided by the voltage dividing circuit 82 to generate the divided voltage 102. However, the voltage value of the power supply voltage Vcc externally applied is different on the basis of the used situation. Hence, the high accuracy can not be attained in the voltage value of the negative voltage 104.

In order to solve the above mentioned, problem, as shown in FIG. 7, it could be considered that a ground potential with a little variation is applied to the voltage dividing circuit 82 instead of the power supply voltage Vcc, a voltage between the ground potential and the negative voltage 104 is divided so as to generate the negative voltage 102. In this case, the negative voltage 104 with the high accuracy could be generated.

However, this negative voltage generating circuit shown in FIG. 7 requires that a negative potential is supplied to the comparing circuit 3 as the reference voltage 120. This results in a complex circuit structure of the comparing circuit 3.

In this way, in the conventional negative voltage generating circuit, there are the following problems:

(1) when the voltage between the power supply voltage and the negative voltage is divided so as to generate the divided voltage, the negative voltage with the high accuracy can not be generated because of the influence of the variation in the power supply voltage; and (2) when the voltage between the ground and the negative voltage is divided so as to generate the divided voltage, a negative voltage is required as the reference voltage of the comparing circuit, resulting in the complex structure of the comparing circuit.

SUMMARY OF THE INVENTION

The present invention is accomplished to solve the above problems. Therefore, an object of the present invention is to provide a negative voltage generating circuit which can generate a negative voltage with a high accuracy without requiring a complex circuit.

In order to achieve an aspect of the present invention, a negative voltage generating circuit includes a reference voltage generating circuit for generating a first reference voltage, voltage dividing circuit for dividing a voltage between the first reference voltage and a negative voltage to produce a division voltage, a comparing circuit for comparing a second reference voltage and the division voltage, and a negative voltage generating section for generating the negative voltage based on the comparing result by the comparing circuit to supply to the voltage dividing circuit.

The voltage dividing circuit may include a first resistor section connected to the first reference voltage and a second resistor section connected to the first resistor section and the negative voltage. Specifically, the first resistor section may include at least one first resistor element, and the second resistor section may include at least one second resistor element which has a same resistance as the first resistor element. In this case, it is desirable that the first and second resistor sections are formed as first and second diffusion layers in a first well of a first conductive type which is formed in a semiconductor region having a second conductive type different from the first conductive type. The first diffusion layer is connected to the first reference voltage at a first end, a second end of the first diffusion layer and a first end of the second diffusion layer are connected to output the division voltage, a second end of the second diffusion layer is connected to the negative voltage, and the first well is connected to one of a positive power supply voltage and the negative voltage based on the first conductive type. Instead, the first and second resistor sections may be formed as first and second diffusion layers in a first well of a first conductive type which is formed in a second well having a second conductive type different from the first conductive type, the second well being formed in a semiconductor region of the first conductive type. The first diffusion layer is connected to the first reference voltage at a first end, a second end of the first diffusion layer and a first end of the second diffusion layer are connected to output the division voltage, a second end of the second diffusion layer is connected to the negative voltage, and the first well is connected to one of a positive power supply voltage and the negative voltage based on the first conductive type, and the second well is connected to the other of the positive power supply voltage and the negative voltage based on the first conductive type.

The voltage dividing circuit may include a plurality of MOS transistors connected in series. In this case, a source of a first one of the MOS transistors is connected to the first reference voltage and a drain of a last one of the MOS transistors is connected to the negative voltage. Also, a source and gate of each of the plurality MOS transistors are connected to each other and a drain and well contact of the MOS transistor are connected to each other, and the drain of the MOS transistor is connected to a source of a next one of the plurality of MOS transistors. Each of the plurality of MOS transistors is desirably formed in a first well of first conductive type which is formed in a second well of a second conductive type which is formed in a semiconductor region of the first conductive type, and the second well is desirably connected to one of a positive power supply voltage and the negative voltage based on the first conductive type.

Otherwise, the voltage dividing circuit may include a first group of MOS transistors connected in series and a second group of MOS transistor circuits, the second group being connected to the first group in series. Each of the MOS transistor circuits may include a first set of a first MOS transistor and a first switch which are connected in series, a second set of a second MOS transistor and a second switch which are connected in series, and a third set of a third switch, the first to third sets are connected in parallel. Also, a first one of the MOS transistors of the first group is connected to the reference voltage and a last one of the sets of the second group is connected to the negative voltage.

The voltage dividing circuit and the comparing circuit are desirably arranged to be adjacent to each other and connected to a ground potential pad.

In order to achieve another aspect of the present invention, a method of generating a negative voltage in a semiconductor device, includes the steps of:

dividing a difference voltage between a constant internal voltage and a negative voltage to produce a division voltage;

comparing a reference voltage and the division voltage; and generating the negative voltage based on the comparing result.

The internal voltage is generated from a power supply voltage. Also, the division voltage is 0 when the negative voltage reaches a desired value.

In order to achieve still another aspect of the present invention, a negative voltage generating circuit includes a reference voltage generating circuit for generating a reference voltage, a voltage dividing circuit for dividing a voltage between the reference voltage and a negative voltage to produce a division voltage, a comparing circuit for comparing a ground potential and a potential corresponding to the division voltage, and a negative voltage generating section for generating the negative voltage based on the comparing result by the comparing circuit to supply to the voltage dividing circuit.

DESCRIPTION OF THE PREFERRED EMBODIMENTS

A negative voltage generating circuit of the present invention will be detailed below in detail with reference to the attached drawings.

Figure 1:
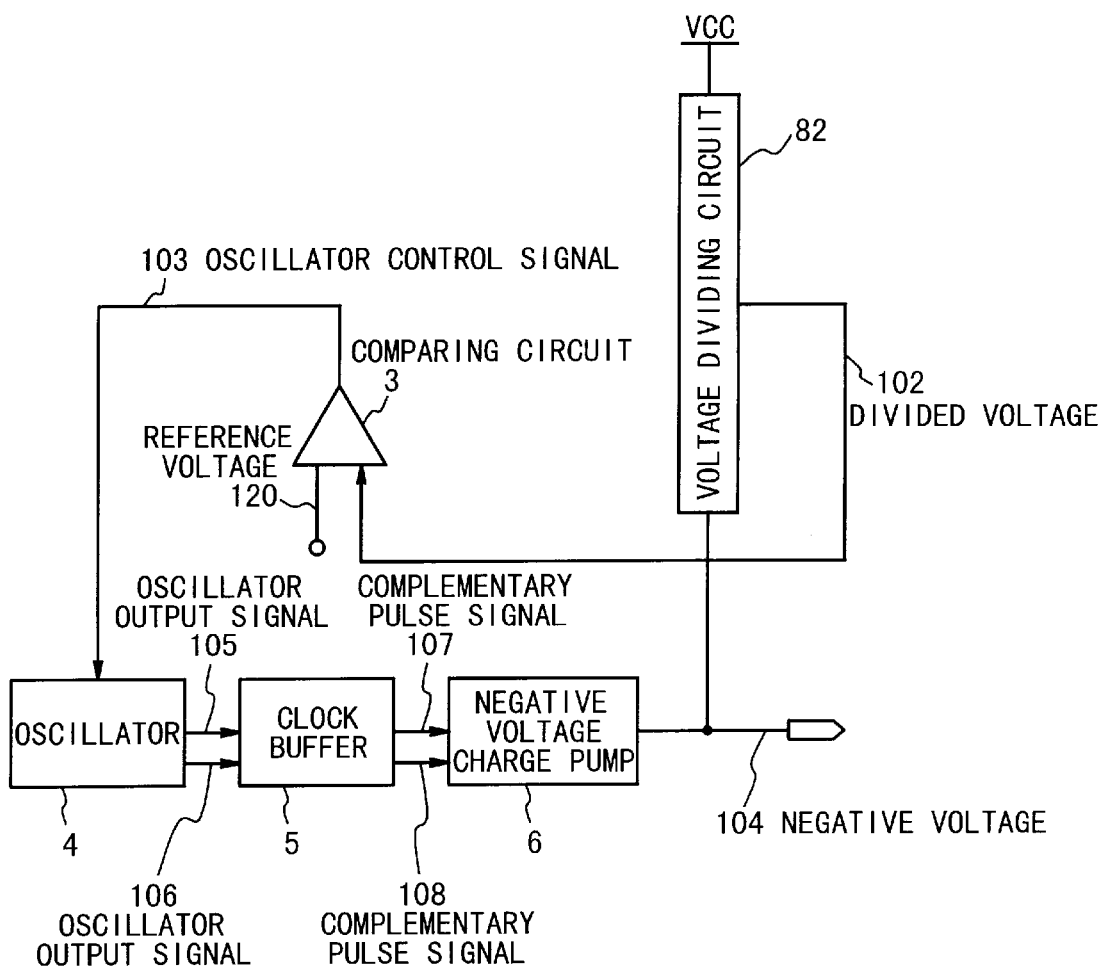
FIG. 1 is a block diagram showing the structure of a conventional negative voltage generating circuit.
Figure 2:
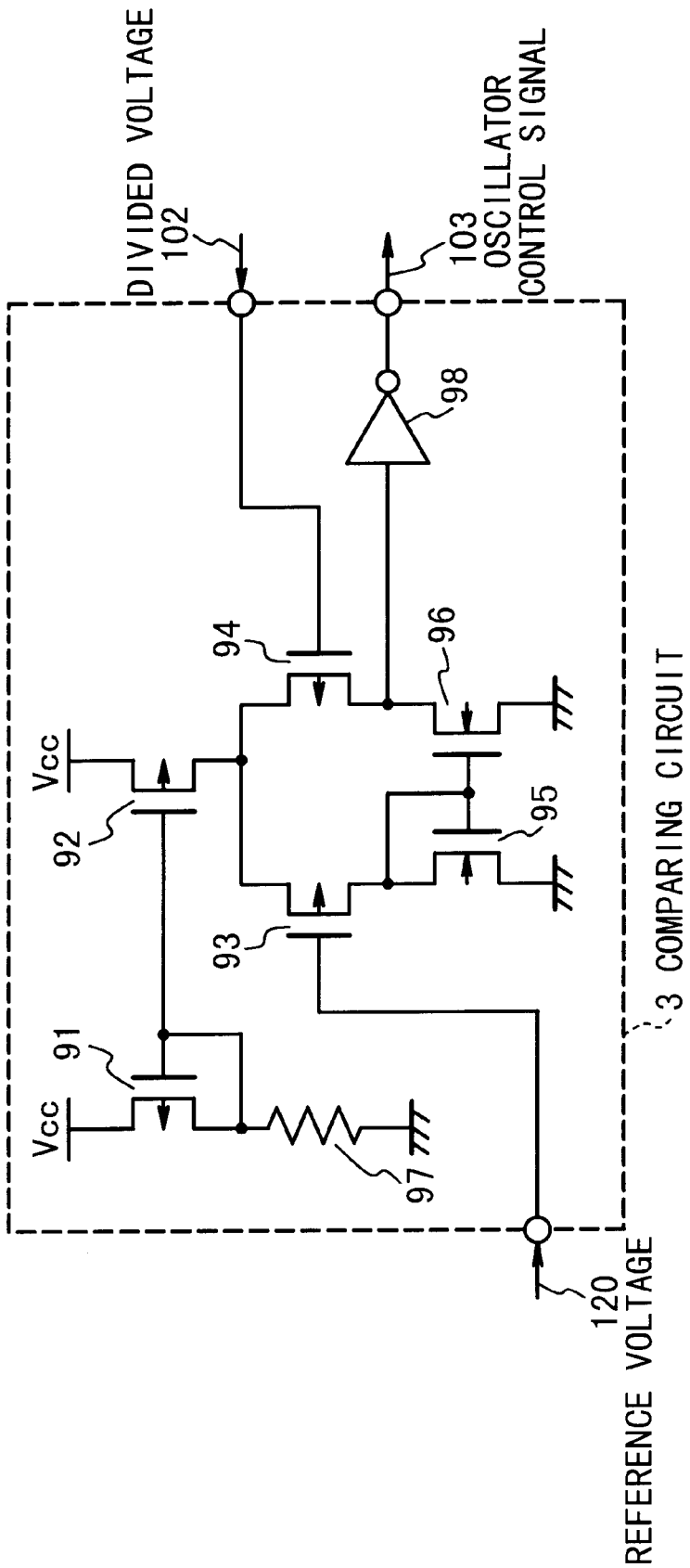
FIG. 2 is a circuit diagram showing the structure of a comparing circuit 3 of the conventional negative voltage generating circuit shown in FIG. 1.
Figure 3:
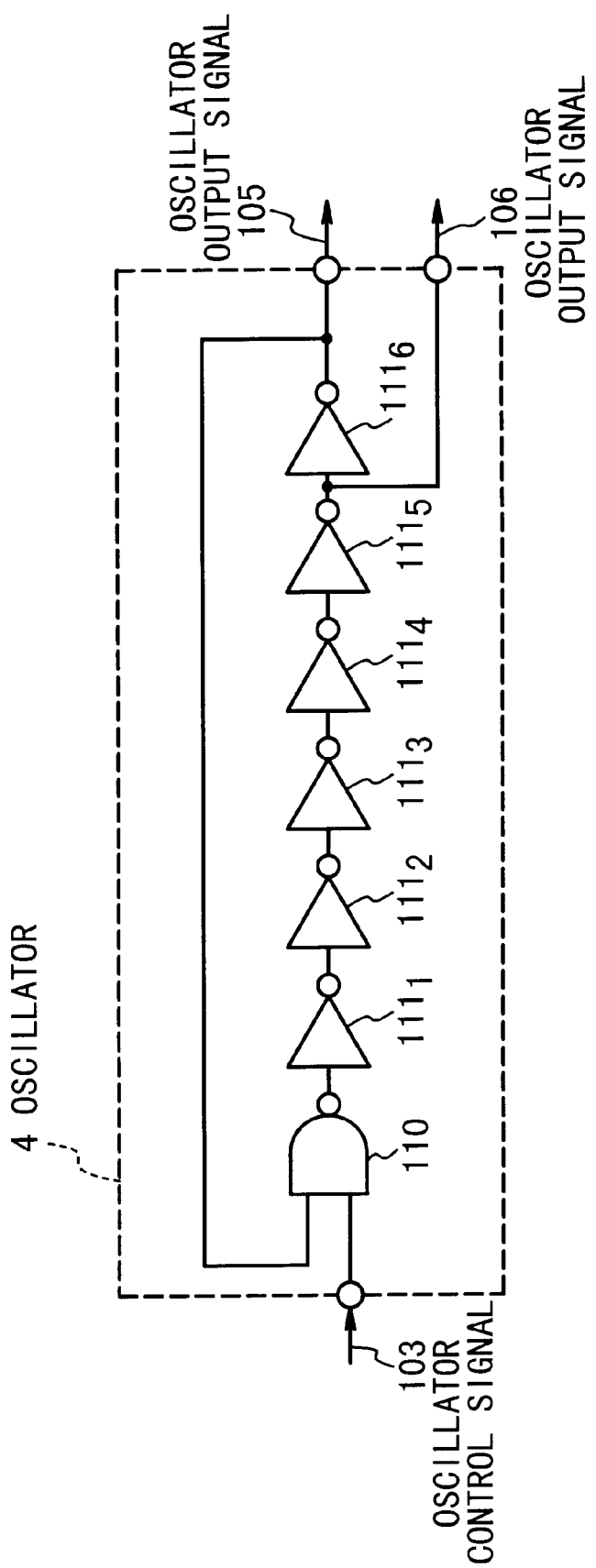
FIG. 3 is a circuit diagram showing the structure of an oscillator 4 of the conventional negative voltage generating circuit shown in FIG. 1.
Figure 4:
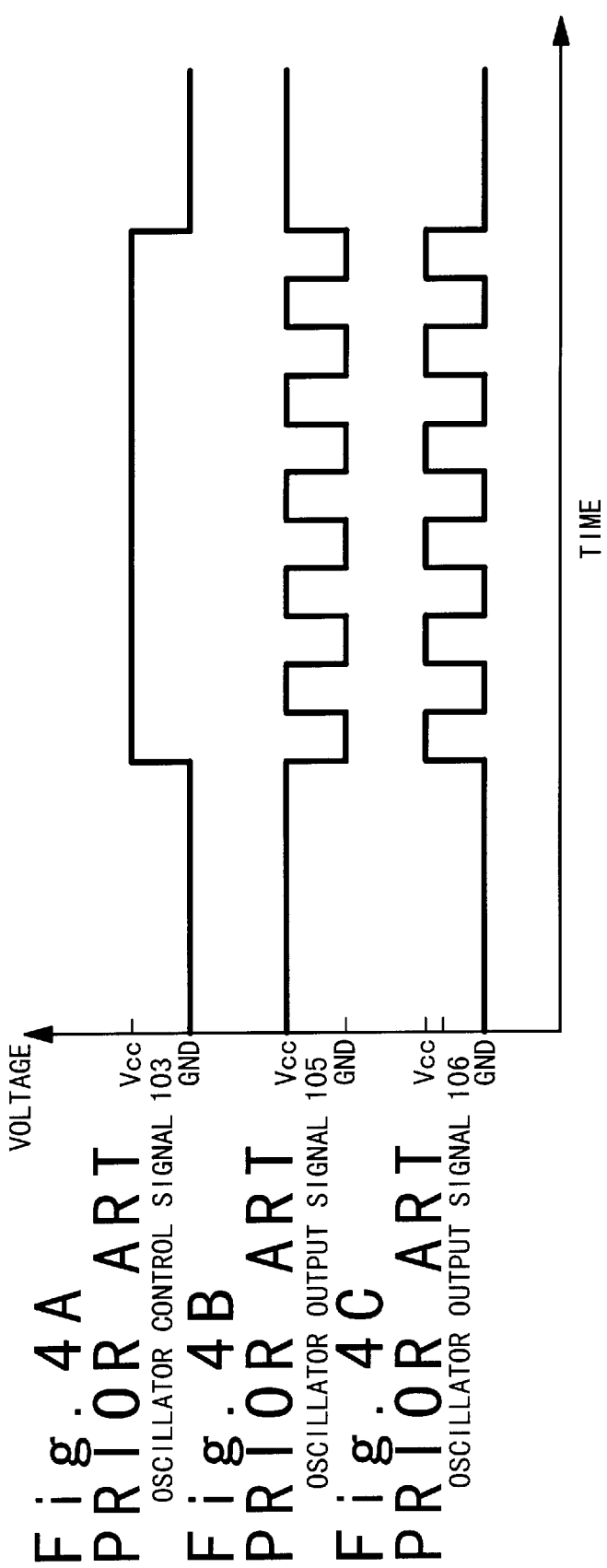
FIGS. 4A to 4C are timing charts to show signal waves of the oscillator 4 of the conventional negative voltage generating circuit.
Figure 5:
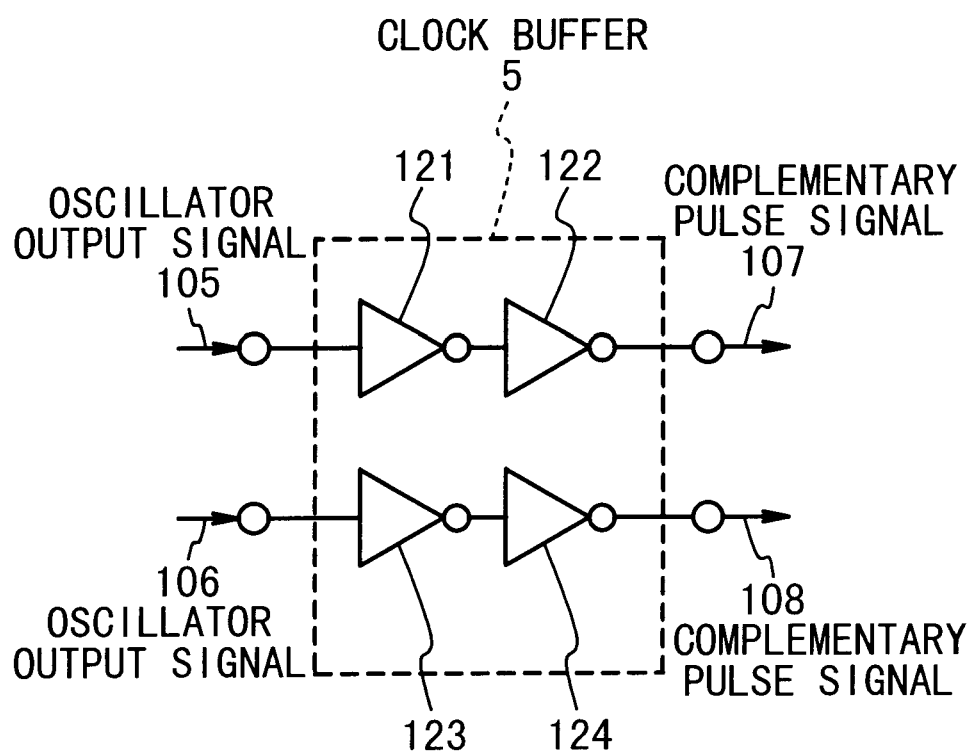
FIG. 5 is a circuit diagram showing the structure of a clock buffer 5 of the conventional negative voltage generating circuit shown in FIG. 1.
Figure 6:
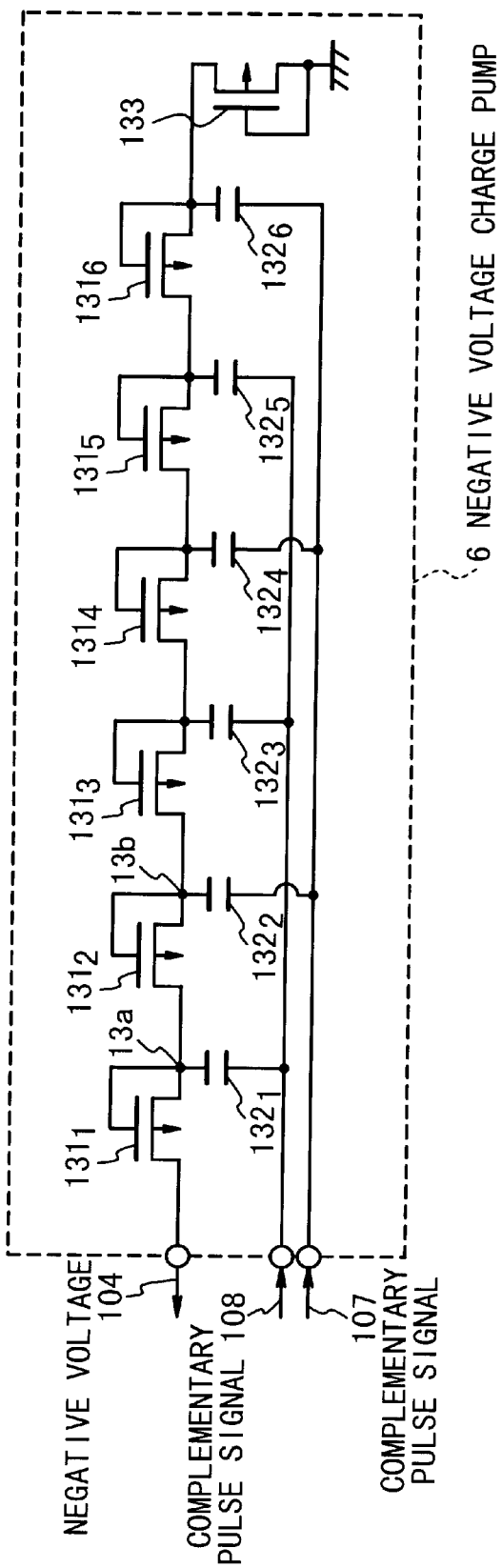
FIG. 6 is a circuit diagram showing the structure of a negative voltage charge pump 6 of the conventional negative voltage generating circuit shown in FIG. 1.
Figure 7:
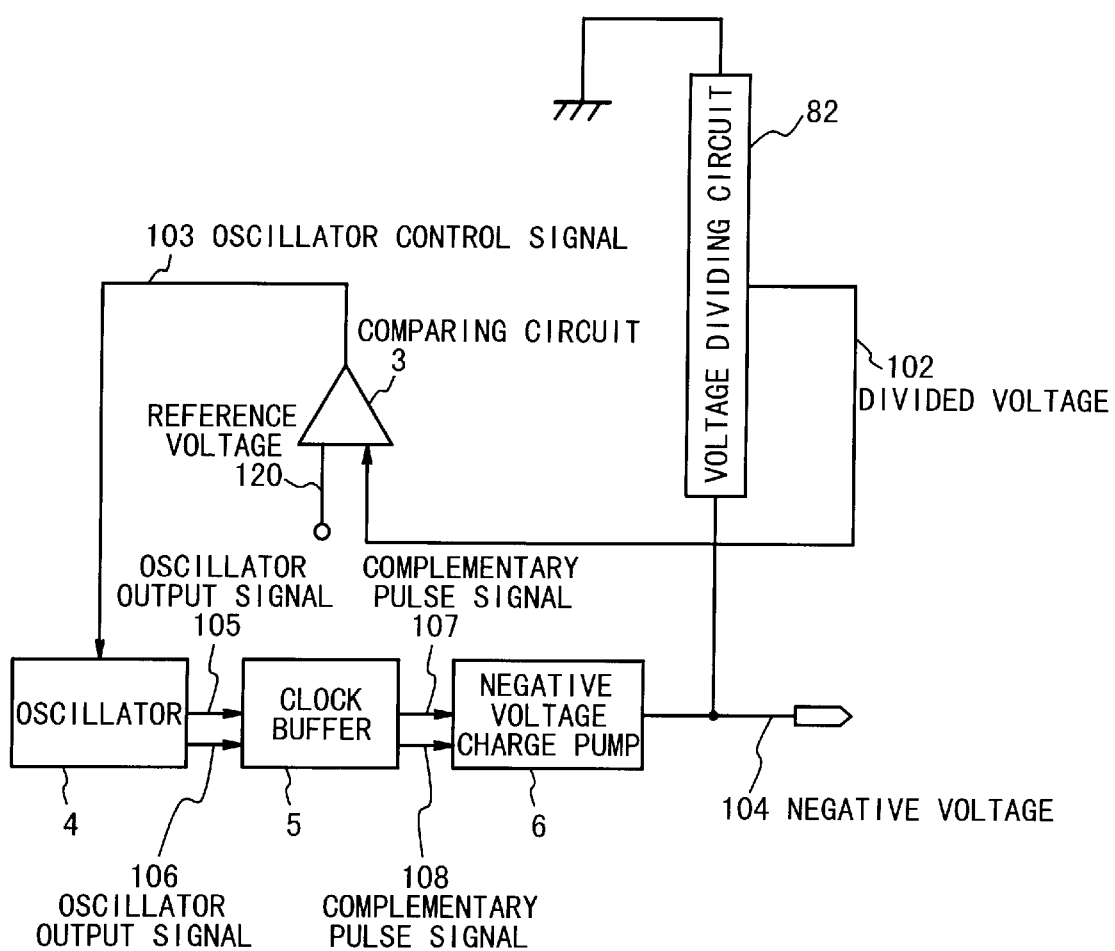
FIG. 7 is a block diagram showing the structure of another conventional negative voltage generating circuit.
Figure 8:
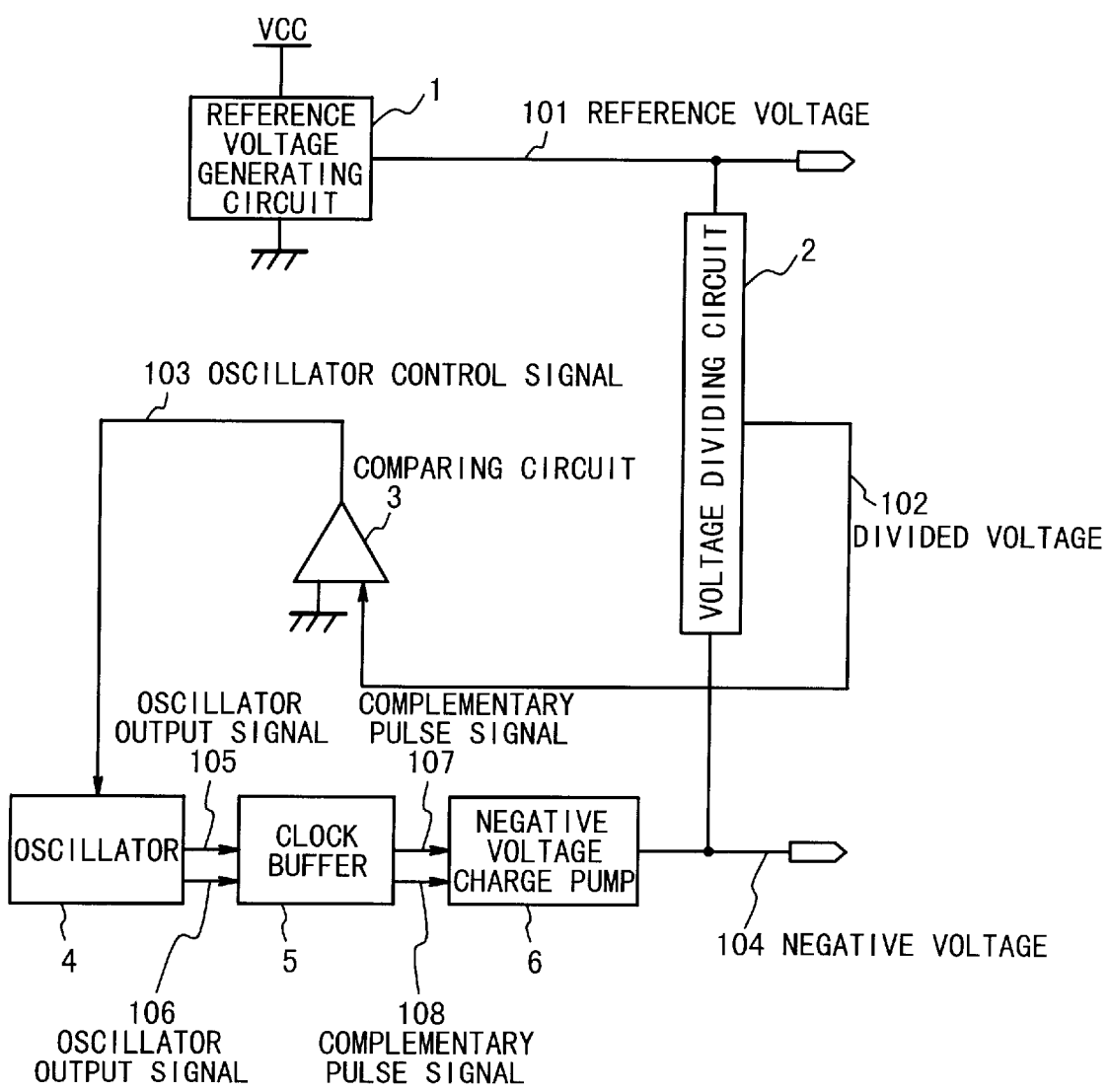
FIG. 8 is a block diagram showing the structure of a negative voltage generating circuit in a first embodiment of the present invention.

FIG. 8 is a block diagram showing a structure of the negative voltage generating circuit according to the first embodiment of the present invention. The numerals similar to those in FIG. 1 denote similar components.

The negative voltage generating circuit in the first embodiment is composed of a reference voltage generating circuit 1, a voltage dividing circuit 2, a comparing circuit 3, and a negative voltage generating section which is composed of an oscillator 4, a clock buffer 5, a negative voltage charge pump 6.

The reference voltage generating circuit 1 generates a constant voltage having a voltage value between the power supply voltage Vcc and the ground, and then outputs a reference voltage 101 to the voltage dividing circuit 2.

The voltage dividing circuit 2 divides a difference voltage between the reference voltage 101 outputted from the reference voltage generator 1 and the negative voltage 104, and then outputs the divided voltage as the divided voltage 102. In this voltage dividing circuit 2, it is assumed that the divided voltage 102 is equal to the ground potential when the negative voltage 104 becomes equal to a desired voltage value. Therefore, the voltage dividing circuit 2 can generate the divided voltage 102 without receiving the influence of the variation of the power supply voltage Vcc.

The comparing circuit 3 compares a voltage value of a reference voltage with a voltage value of the divided voltage 102. The comparing circuit 3 sets an oscillator control signal 103 to an active state when the voltage value of the divided voltage 102 is equal to or higher than that of the reference voltage (0 V in this example), and sets the oscillator control signal 103 to an inactive state when the voltage value of the divided voltage 102 is lower than that of the reference voltage.

The voltage dividing circuit 2 is designed in such a manner that the divided voltage 102 outputted by the voltage dividing circuit 2 becomes equal to the ground potential when the negative voltage 104 is equal to the desired negative voltage. Therefore, it is sufficient for the comparing circuit 3 to compare the divided voltage 104 with the ground potential to generate the oscillator control signal 103. Hence, it is not necessary that the complex circuit is used in the comparing circuit 3.

The oscillator 4 generates and outputs two oscillator output signals 105 and 106 whose phases become opposite to each other, when the oscillator control signal 103 is in the active state.

The clock buffer 5 receives the oscillator output signals 105 and 106 outputted from the oscillator 4, and then outputs complementary pulse signals 107 and 108 though inverters 121 and 122 and inverters 123 and 124, respectively.

The negative voltage charge pump 6 generates and outputs the negative voltage 104 from the complementary pulse signals 107 and 108.

The structures of comparing circuit 3, oscillator 4, clock buffer 5 and negative voltage charge pump 6 are similar to those shown in FIGS. 2, 3, 5, and 6. Therefore, the descriptions are omitted.

Figure 9A:
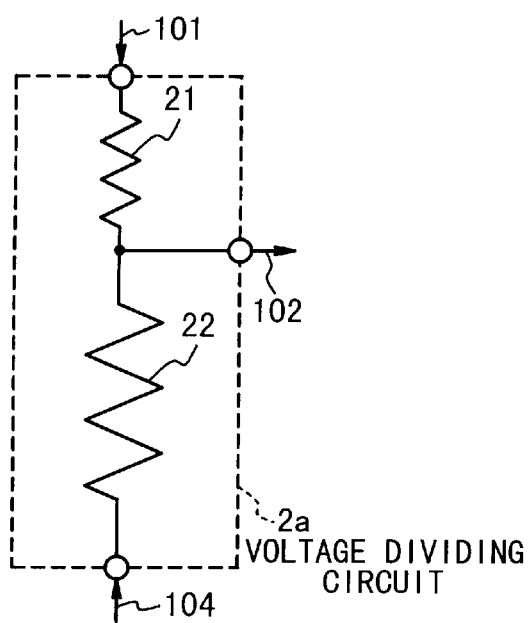
FIG. 9A is a circuit diagram when a voltage dividing circuit 2a of the negative voltage generating circuit in the first embodiment of the present invention.
Figure 9B:
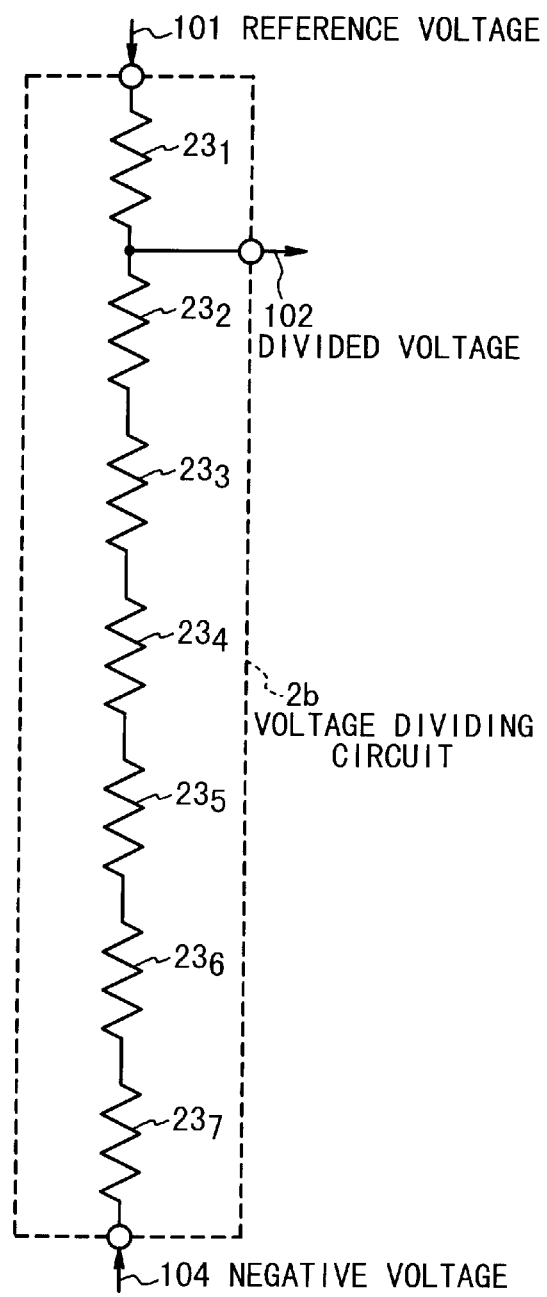
FIG. 9B is a circuit diagram when another voltage dividing circuit 2b of the negative voltage generating circuit in the first embodiment of the present invention.

Next, a specific example of the voltage dividing circuit 2 will be described below with reference to FIGS. 9A and 9B and FIGS. 10A and 10B. FIGS. 9A and 9B show examples in which the voltage dividing circuit 2 is constituted by using a resistor division circuit.

FIG. 9A shows a voltage dividing circuit 2a as a specific example of the voltage dividing circuit 2. The voltage dividing circuit 2a is composed of two resistors 21 and 22 which are connected in series and have values different from each other. In the voltage dividing circuit 2a, the respective values of the two resistors 21 and 22 are changed such that the divided voltage 102 is equal to the ground potential when the desired negative voltage 104 is attained.

FIG. 9B shows a voltage dividing circuit 2b as another specific example of the voltage dividing circuit 2. In this voltage dividing circuit 2b, seven resistors 231 to 237 having the same value are connected in series. In this voltage dividing circuit 2b, the number of resistors to be connected is changed such that the divided voltage 102 becomes equal to the ground potential when the desired negative voltage 104 is attained.

Figure 10A:
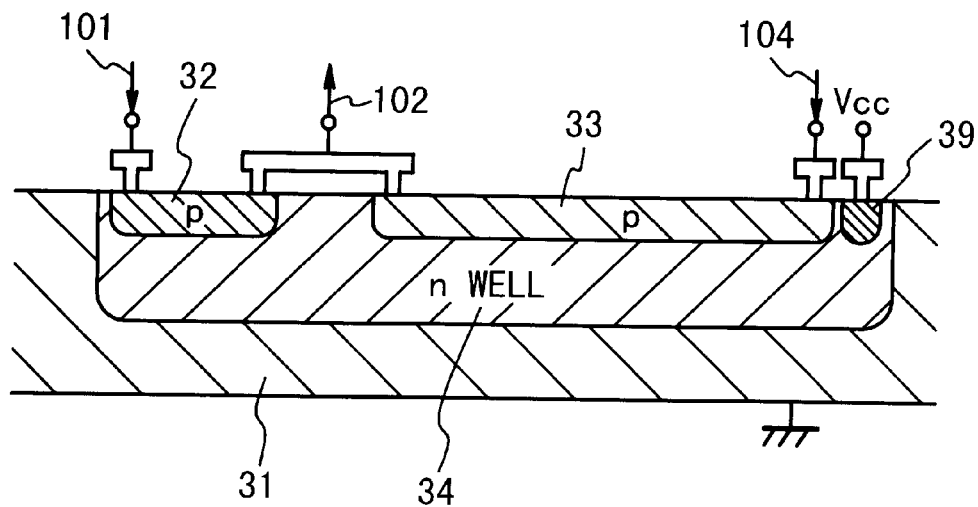
FIG. 10A is a section view of the voltage dividing circuit 2a of FIG. 9A constituted to have a twin well structure.
Figure 10B:
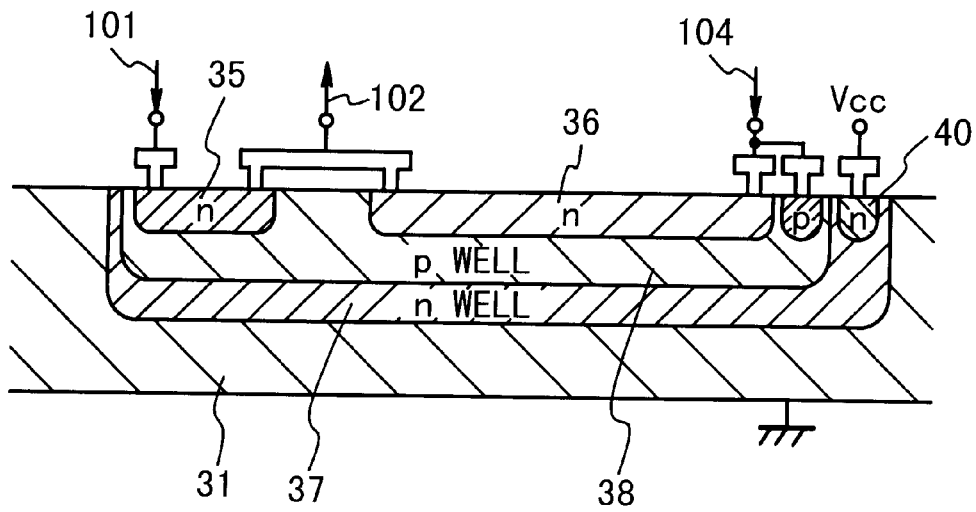
FIG. 10B is a section view of the voltage dividing circuit 2b of FIG. 9b constituted to have a triple well structure.

FIGS. 10A and 10B show section views of a semiconductor structure of the voltage dividing circuit 2a shown in FIG. 9A. FIG. 10A shows a case in which the voltage dividing circuit 2a is constituted by a twin well structure. FIG. 10B shows a case in which the voltage dividing circuit 2a is constituted by a triple well structure.

At first, the case of the twin well structure shown in FIG. 10A will be described.

In this voltage dividing circuit 2a shown in FIG. bOA, an N well 34 is formed in a P type substrate 31, and P type impurity diffusion layers 32 and 33 are formed in the surface of the N well 34. The reference voltage 101 is applied to one end of the P type impurity diffusion layer 32, and the other end is connected to one of the P type impurity diffusion layer 33. Also, the divided voltage 102 is outputted therefrom. The negative voltage 104 is applied to the other end of the P type impurity diffusion layer 33. The power supply voltage Vcc is applied to the N well 34 through an N well contact 39. The P type substrate 31 is connected to the ground. Accordingly, since a potential of the N well 34 is higher than that of the P type substrate 31, the P type substrate 31 and the N well 34 are electrically insulated from each other. The reference voltage 101 applied to the P type impurity diffusion layer 32 and the negative voltage 104 applied to the P type impurity diffusion layer 33 are lower than the power supply voltage Vcc. Thus, each of the P type impurity diffusion layers 32 and 33 and the N well 34 are electrically insulated from each other.

In this voltage dividing circuit 2a shown in FIG. 10A, the resistor 21 is formed of the P type impurity diffusion layer 32, and the resistor 22 is formed of the P type impurity diffusion layer 33.

The electrically conductive properties of the P type impurity diffusion layers 32 and 33 are determined based on the densities of the diffused impurity ions, the diffusion depths and areas. Thus, the densities of the diffused impurity in the P type impurity diffusion layers 32 and 33, the diffusion depths and areas are adjusted to determine the values of the resistors such that the divided voltage 102 is equal to the ground potential, when the negative voltage 104 becomes equal to the desired voltage value.

The case of the triple well structure shown in FIG. 10B will be described below.

In this voltage dividing circuit 2a shown in FIG. 10B, an N well 37 is formed in a P type substrate 31, a P well 38 is formed in the N well 37. N type impurity diffusion layers 35 and 36 are formed in the surface of the P well 38. The reference voltage 101 is applied to one end of the N type impurity diffusion layer 35, and the other end of the N type impurity diffusion layer 35 is connected to one end of the N type impurity diffusion layer 36. The divided voltage 102 is outputted therefrom. The negative voltage 104 is applied to the other end of the N type impurity diffusion layer 36. The power supply voltage Vcc is applied to the N well 37 through an N well contact 40. The P type substrate 31 is connected to the ground. Accordingly, the P type substrate 31 and the N well 37 are electrically insulated from each other. The negative voltage 104 applied to the P well 38 is lower than the power supply voltage Vcc. Thus, the P well 38 and the N well 37 are electrically insulated from each other.

In FIG. 10B, the values of the resistors are determined by the manner similar to that in FIG. 10A. The triple well structure shown in FIG. 10B has a demerit that the area is increased because margin is required when master patterns of the N well 37 and the P well 38 are designed. However, the triple well structure has a merit that the potential difference between junction is made smaller as compared with the twin well structure.

Specifically, in the twin well structure shown in FIG. 10A, a voltage between the negative voltage 104 and the N well 34 whose potential is equal to the power supply voltage Vcc is the highest voltage between the junction. For example, this voltage is 17 V if the power supply voltage Vcc is 5 V and the negative voltage 104 is −12 V.

On the contrary, in the triple well structure in FIG. 10B, a voltage between the reference voltage 101 and the P well 38 whose potential is equal to the negative voltage 104 is the highest voltage between the junction. This voltage is 14 V, which is lower than 17 V, if the reference voltage 101 is 2 V and the negative voltage 104 is −12 V. In this way, the potential difference between the junction can be made smaller in the triple well structure.

Now, the structure of the voltage dividing circuit 2a shown in FIG. 9A will be described. However, the voltage dividing circuit 2b shown in FIG. 9B can be similarly constituted by using the twin well structure or the triple well structure.

A plurality of resistors having the same size are formed in this case. However, these values of the resistors having the same size are varied in the same direction, even if a mask pattern, the impurity density, the diffusion depth and area are varied. Thus, the voltage dividing circuit with the high accuracy can be attained in the case where the plurality of resistors having the same size are provided and the voltage is divided using the plurality of resistors, as compared with a case where a voltage is divided using the resistors whose sizes are different from each other.

The negative voltage generating circuit according to the second embodiment of the present invention will be described below.

Figure 11:
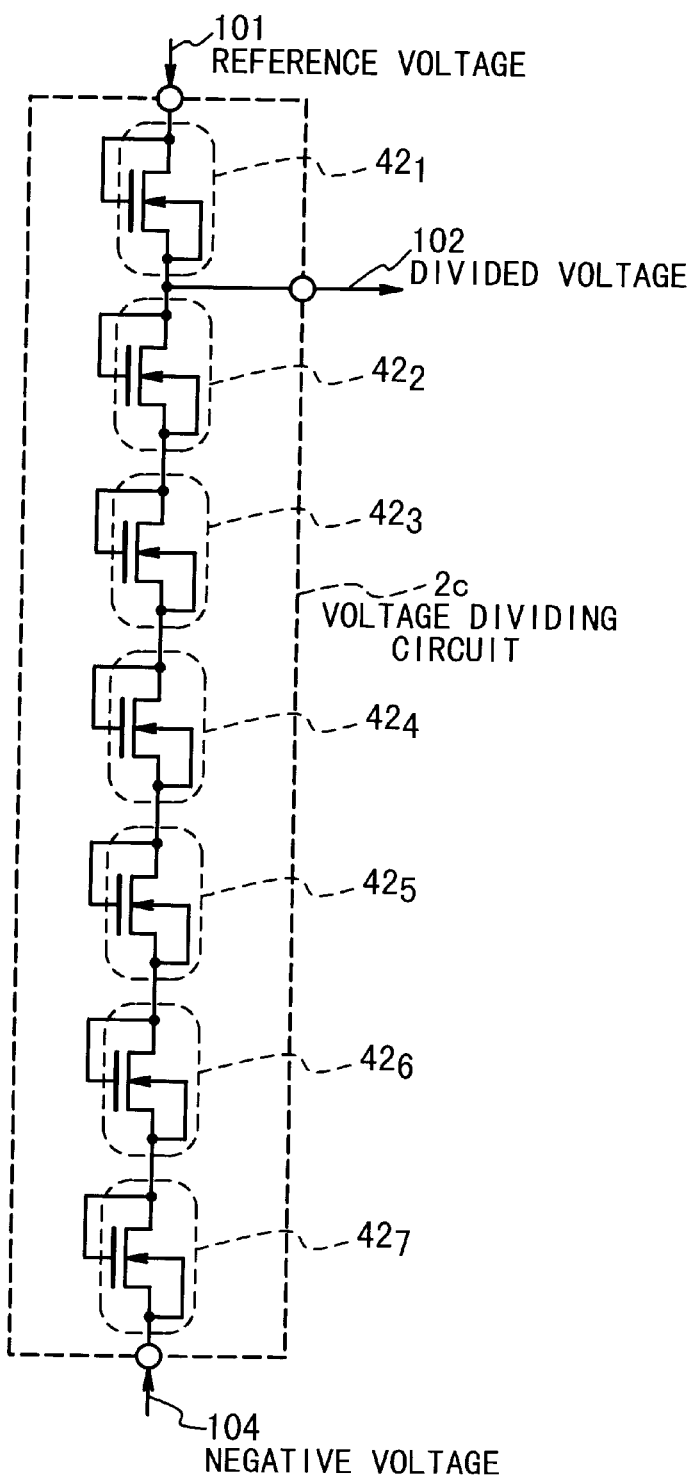
FIG. 11 is a circuit diagram of the structure of a voltage dividing circuit 2c in the negative voltage generating circuit according to a second embodiment of the present invention.

A negative voltage generating circuit in the second embodiment uses a voltage dividing circuit 2c shown in FIG. 11 instead of a specific example of the voltage dividing circuit 2 in the first embodiment shown in FIG. 8. In the first embodiment, the voltage dividing circuit 2 is constituted by using the resistor division circuit. However, in the second embodiment, the reference voltage 101 and the negative voltage 104 are divided by using N-channel MOS transistors, and thereby the divided voltage 102 is generated. In the voltage dividing circuit 2c, seven N-channel MOS transistors $42_1$ to $42_7$ are connected in series, as shown in FIG. 11.

Figure 12:
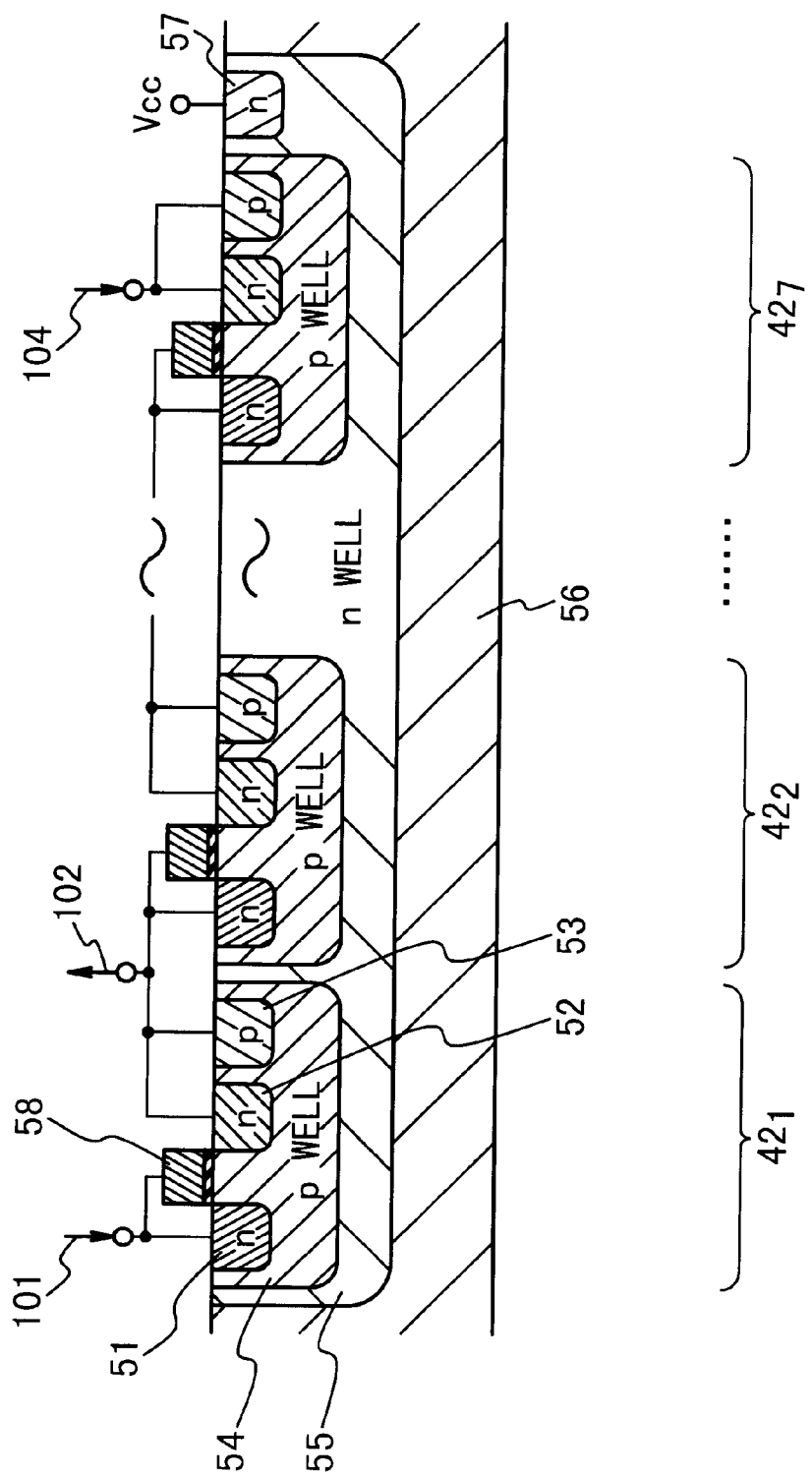
FIG. 12 is a section view of the voltage dividing circuit 2c of FIG. 11 constituted to have a triple well structure.

FIG. 12 shows a section view of the voltage dividing circuit 2c in FIG. 11. The seven N-channel MOS transistors $42_1$ to $42_7$ have the same structure. Thus, only the structure of the N-channel MOS transistor $42_1$ will be described.

In this N-channel MOS transistor $42_1$, an N well 55 is formed in a P type substrate 56, P wells 54 are formed in the N well 55. A drain diffusion layer 51, a source diffusion layer 52 and a P well contact 53 are formed in the surface of the P well 54. Moreover, a gate electrode 58 is formed through an insulation film on the P well 54.

The gate electrode 58 and the drain diffusion layer 51 are connected to each other, and the reference voltage 101 is applied to the gate electrode 58 and the drain diffusion layer 51. The source diffusion layer 52 and the P well contact 53 are connected to each other, and further connected to a drain diffusion layer of the N-channel MOS transistor $42_2$ adjacent to the N-channel MOS transistor $42_1$. Then, the divided voltage 102 is outputted from the portion between the N-channel MOS transistor $42_1$ and the N-channel MOS transistor $42_2$. The power supply voltage Vcc is applied through a N well contact 57 to the N well 55.

If the potential difference between the source diffusion layer 52 and the drain diffusion layer 51 is equal to or greater than a threshold of the N-channel MOS transistor $42_1$ when a voltage is applied to the drain diffusion layer 51, this N-channel MOS transistor $42_1$ is set to a conductive state. Thus, a current begins to flow.

For example, it is supposed that the threshold voltage be 1 V. Since the voltage dividing circuit 2c in FIG. 11 is composed of the seven N-channel MOS transistors $42_1$ to $42_7$, the current begins to flow, when the potential difference between the reference voltage 101 and the negative voltage 104 is equal to or greater than 7 V. Then, the voltage dividing circuit 2c starts the operation as the voltage dividing circuit. At this time, the same current flows through all the N-channel MOS transistors $42_1$ to $42_7$. Thus, the potential difference between the gate electrode 58 and the source diffusion layer 52 is the same voltage even in any of the N-channel MOS transistors $42_1$ to $42_7$. Since each source diffusion layer 52 is connected to the P well 54 through the P well contact 53, there is no variation of the threshold voltage due to the substrate influence.

As mentioned above, in the second embodiment, the voltage dividing circuit having the high accuracy can be attained with low consumption current and the small block size, if all mutual conductances gm of the N-channel MOS transistors $42_1$ to $42_7$ are equally designed.

In this voltage dividing circuit 2c, the N-channel MOS transistors $42_1$ to $42_7$ having the same size are connected in series, similarly to the voltage dividing circuit 2b using the resistor division shown in FIG. 9B. Thus, the values of the resistors are varied in the same direction even if the mask patterns, the impurity densities, the diffused depths and area are varied. Hence, the voltage dividing circuit with the high accuracy can be attained, as compared with the manner of dividing by using the N-channel MOS transistors whose sizes are different from each other.

The negative voltage generating circuit accordance with the third embodiment of the present invention will be described below.

Figure 13:
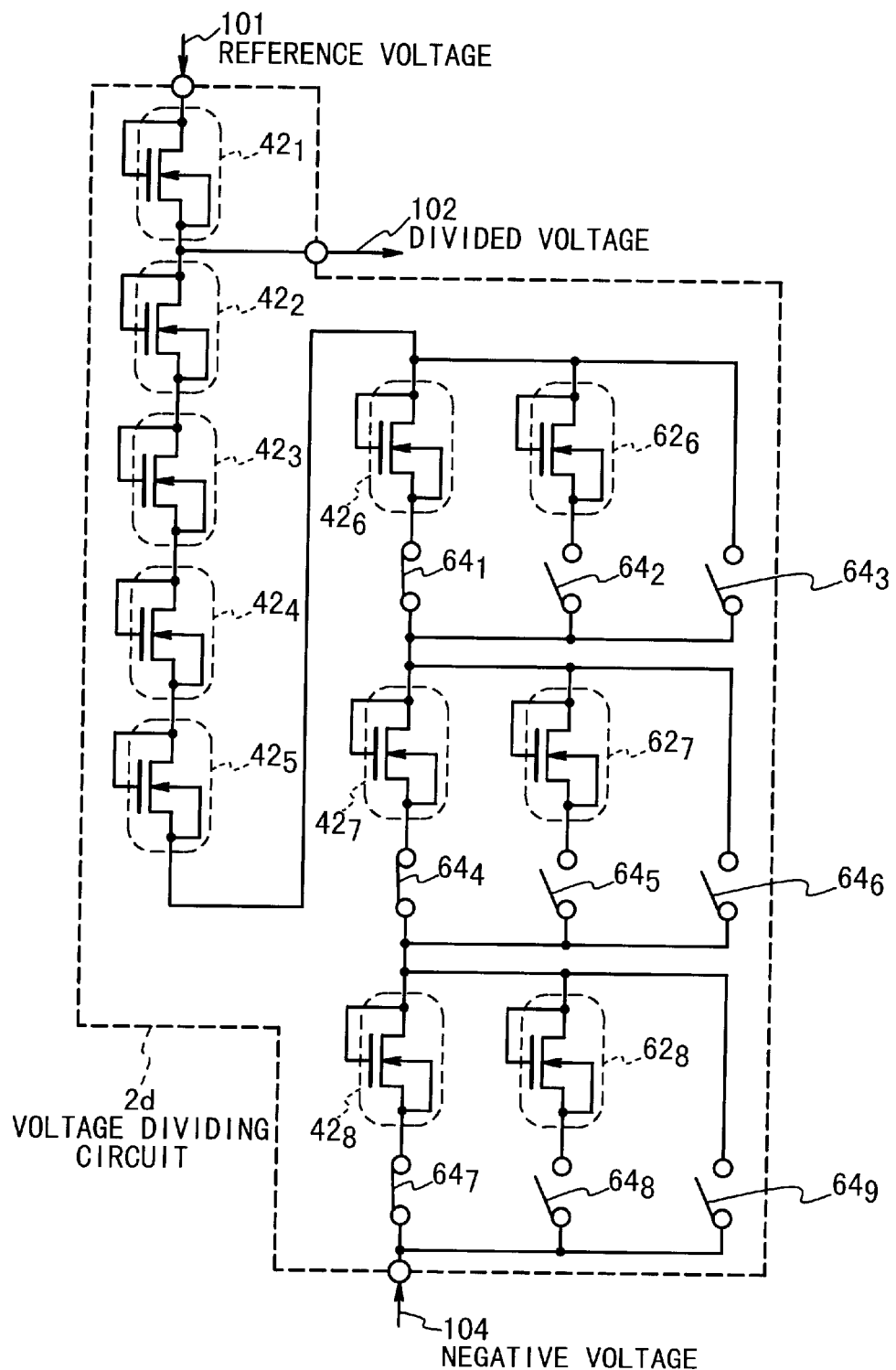
FIG. 13 is a circuit diagram of a voltage dividing circuit 2d in the negative voltage generating circuit according to a third embodiment of the present invention.

The negative voltage generating circuit in the third embodiment uses a voltage dividing circuit $2d$ shown in FIG. 13 as a specific example of the voltage dividing circuit 2 shown in FIG. 8.

This voltage dividing circuit $2d$ composed of N-channel MOS transistors $42_1$ to $42_8$ and $62_6$ to $62_8$ divides a voltage between the reference voltage 101 and the negative voltage 104, similarly to the voltage dividing circuit $2c$ in the second embodiment. Also, switches $64_1$ to $64_9$ are disposed to set the divided voltage to the desired negative voltage 104.

Mutual conductances gm of the N-channel MOS transistors $62_6$ to $62_8$ are designed to be larger than mutual conductances gm of the N-channel MOS transistors $42_1$ to $42_8$. Also, a voltage between a source and drain of each of the N-channel MOS transistors $62_6$ to $62_8$ is set to be half of that of each of the N-channel MOS transistors $42_1$ to $42_8$.

For example, if only the switches $64_1$, $64_4$ and $647$ are turned on and the other switches are turned off when the reference voltage 101 is 2 V, the voltage dividing circuit $2d$ becomes similar to the voltage dividing circuit $2c$ shown in FIG. 11. Thus, when the negative voltage 104 is −14 V, the divided voltage 102 is equal to the ground potential. Also, if only the switches $62_1$, $62_4$ and $62_8$ are turned on and the other switches are turned off when the negative voltage 104 is −13 V, the divided voltage 102 is equal to the ground potential.

As mentioned above, in this embodiment, if the switches $64_1$ to $64_9$ are switched as shown in the following table 1, when the reference voltage 101 is 2 V, the voltage value which can be set as the negative voltage 104 can be selected at a step of 1 V between −8 and −14 V. In this manner, in this embodiment, the voltage value of the desired negative voltage 104 can be selected by switching the connections of the N-channel MOS transistors by using the switches.

Figure 14:
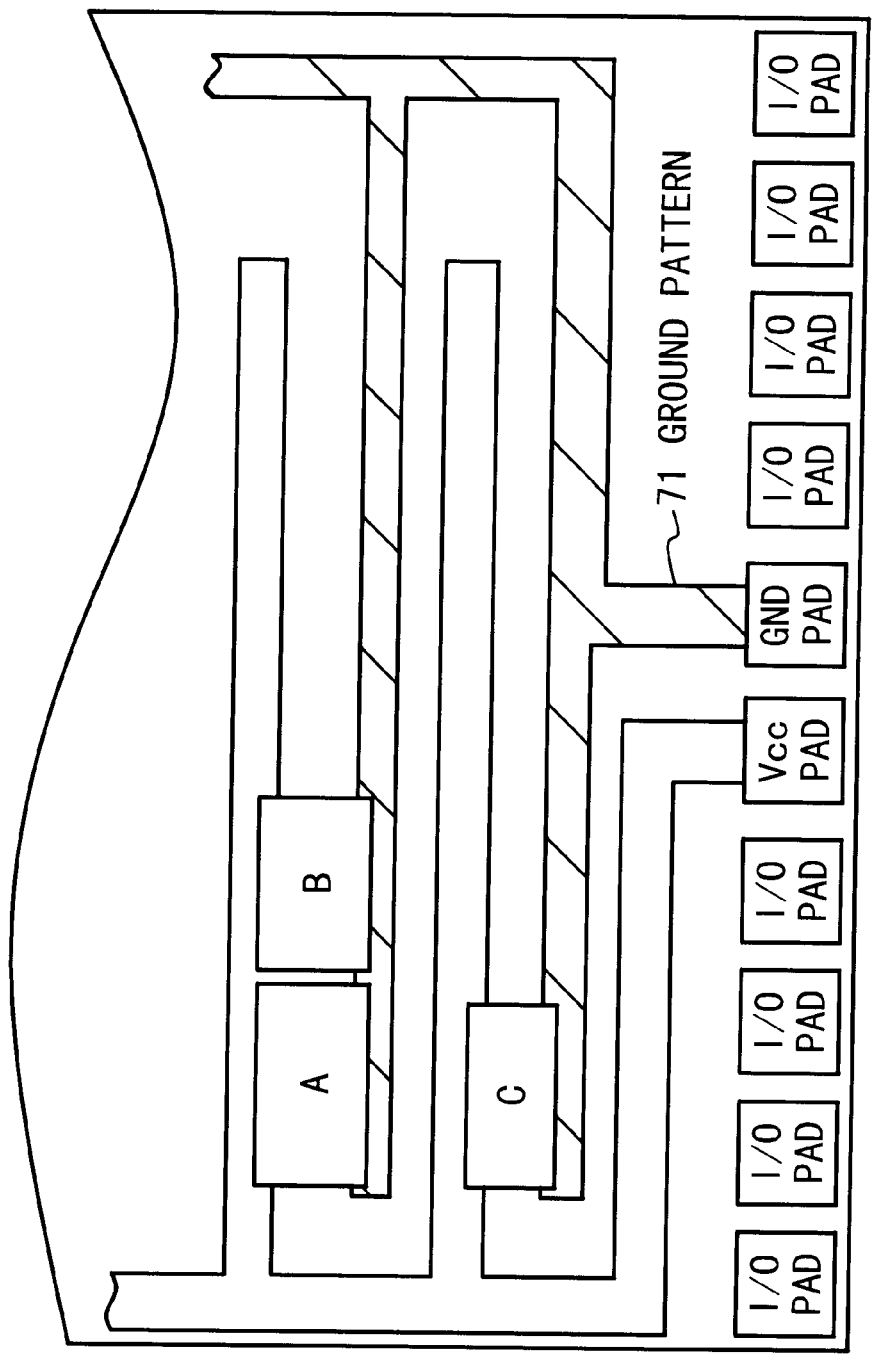
FIG. 14 is a view showing a wiring pattern arrangement in the negative voltage generating circuit according to a fourth embodiment of the present invention.

In the negative voltage generating circuit in the fourth embodiment, a ground pattern of the reference voltage generator 1 and a ground pattern of the comparing circuit 3 are connected to a common ground pad and the reference voltage generator 1 and the comparing circuit 3 are provided on positions where properties such as values of current flowing out from the ground pad are substantially equal to each other, in the negative voltage generating circuits of the first to third embodiments. In the fourth embodiment, since the reference voltage generator 1 and the comparing circuit 3 are arranged to have the above mentioned positional relation, the deviation of the voltage can be canceled between the reference voltage generator 1 and the comparing circuit 3. Hence, the negative voltage 104 with the high accuracy can be attained in addition to the effects of the first to third embodiments. Specifically, the reference voltage generator 1 and the comparing circuit 3 are arranged on positions A and B as shown in FIG. 14 and are connected to a ground pattern 71. Thus, the above mentioned condition is satisfied. However, when the reference voltage generator 1 and the comparing circuit 3 are arranged on positions A and C or positions B and C, the above mentioned condition is not satisfied.

As mentioned above, according to the present invention, the negative voltage with the high accuracy can be generated without requiring a complex circuit.

What is claimed is:

1. A negative voltage generating circuit comprising:
a reference voltage generating circuit for generating a first reference voltage;
a voltage dividing circuit for dividing a voltage between said first reference voltage and a negative voltage to produce a division voltage;
a comparing circuit for comparing a second reference voltage and said division voltage; and
a negative voltage generating section for generating said negative voltage based on the comparing result by said comparing circuit to supply to said voltage dividing circuit,
wherein said voltage dividing circuit and said comparing circuit are arranged to be adjacent to each other,

TABLE 1

| Volt 104 (V) | SW64$_7$ | SW64$_8$ | SW64$_9$ | SW64$_4$ | SW64$_5$ | SW64$_6$ | SW64$_1$ | SW64$_2$ | SW64$_3$ |
|---|---|---|---|---|---|---|---|---|---|
| −14 | ON | OFF | OFF | ON | OFF | OFF | ON | OFF | OFF |
| −13 | OFF | ON | OFF | ON | OFF | OFF | ON | OFF | OFF |
| −12 | OFF | OFF | ON | ON | OFF | OFF | ON | OFF | OFF |
| −11 | OFF | OFF | ON | OFF | ON | OFF | ON | OFF | OFF |
| −10 | OFF | OFF | ON | OFF | OFF | ON | ON | OFF | OFF |
| −9 | OFF | OFF | ON | OFF | OFF | ON | OFF | ON | OFF |
| −8 | OFF | OFF | ON | OFF | OFF | ON | OFF | OFF | ON |

In the above description, the example in which the connections between the N-channel MOS transistors are switched by using the switches $64_1$ to $64_9$ is described in this embodiment. However, when it is actually manufactured as the semiconductor, it is possible to change a wiring pattern to switch the connections. Thus, the connections between the N-channel MOS transistors can be accomplished without any switches.

Next, the negative voltage generating circuit according to the fourth embodiment of the present invention will be described.

wherein a ground pattern of said reference voltage generating circuit and a ground pattern of said comparing circuit are connected to a common ground potential pad, wherein said voltage dividing circuit includes a first resistor section connected to said first reference voltage and a second resistor section connected to said first resistor section and said negative voltage, wherein said first and second resistor sections are formed as first and second diffusion layers in a first well of a first conductive type which is formed in a second well having a second conductive type different from said first conductive type, said second well being formed in a semiconductor region of said first conductive type, and wherein said first diffusion layer is connected to said first reference voltage at a first end, a second end of said first diffusion layer and a first end of said second diffusion layer are connected to output said division voltage, a second end of said second diffusion layer is connected to said negative voltage, and said first well is connected to said negative voltage, and said second well is connected to a positive power supply voltage.

2. A negative voltage generating circuit comprising:

a reference voltage generating circuit for generating a first reference voltage;

a voltage dividing circuit for dividing a voltage between said first reference voltage and a negative voltage to produce a division voltage;

a comparing circuit for comparing a second reference voltage and said division voltage; and a negative voltage generating section for generating said negative voltage based on the comparing result by said comparing circuit to supply to said voltage dividing circuit, wherein said voltage dividing circuit and said comparing circuit are arranged to be adjacent to each other, wherein a ground pattern of said reference voltage generating circuit and a ground pattern of said comparing circuit are connected to a common ground potential pad, wherein said voltage dividing circuit includes a first group of MOS transistors connected in series and a second group of MOS transistor circuits, said second group is connected to said first group in series, each of said MOS transistor circuits includes a first set of a first MOS transistor and a first switch which are connected in series, a second set of a second MOS transistor and a second switch which are connected in series, and a third set of a third switch, said first to third sets are connected in parallel, and wherein a first one of said MOS transistors of said first group is connected to said reference voltage and a last one of said sets of said second group is connected to said negative voltage.

3. A negative voltage generating circuit according to claim 2, wherein a mutual conductance of each of said MOS transistors in said first group is less than a mutual conductance of each of said second MOS transistors in said second group.

4. A negative voltage generating circuit according to claim 3, wherein a voltage between a source and drain of each of said second MOS transistors in said second group is set to one-half of a voltage between a source and drain of each of said MOS transistors in said first group.

5. A method of generating a negative voltage in a semiconductor device, comprising the steps of:

dividing a difference voltage between a constant internal voltage and a negative voltage to produce a division voltage;

comparing a reference voltage and said division voltage; and generating said negative voltage based on the comparing result, wherein said dividing step includes dividing said difference voltage using a first group of MOS transistors connected in series and a second group of MOS transistors circuits, said second group is connected to said first group in series, each of said MOS transistor circuits includes a first set of a first MOS transistor and a first switch which are connected in series, a second set of a second MOS transistor and a second switch which are connected in series, and a third set of a third switch, said first to third sets are connected in parallel.

6. A method according to claim 5, wherein a mutual conductance of each of said MOS transistors in said first group is less than a mutual conductance of each of said second MOS transistors in said second group.

7. A method according to claim 6, wherein a voltage between a source and drain of each of said second MOS transistors in said second group is set to one-half of a voltage between a source and drain of each of said MOS transistors in said first group.

8. A negative voltage generating circuit comprising:

a reference voltage generating circuit for generating a reference voltage;

a voltage dividing circuit for dividing a voltage between said reference voltage and a negative voltage to produce a division voltage;

a comparing circuit for comparing a ground potential and a potential corresponding to said division voltage; and a negative voltage generating section for generating said negative voltage based on the comparing result to supply to said voltage dividing circuit, wherein said voltage dividing circuit and said comparing circuit are arranged on a substrate to be adjacent to each other, wherein a ground pattern of said reference voltage generating circuit and a ground pattern of said comparing circuit are connected to a common ground potential pad, wherein said voltage dividing circuit includes a first resistor section connected to said first reference voltage and a second resistor section connected to said first resistor section and said negative voltage, wherein said first and second resistor sections are formed as first and second diffusion layers in a first well of a first conductive type which is formed in a second well having a second conductive type different from said first conductive type, said second well being formed in a semiconductor region of said first conductive type, and wherein said first diffusion layer is connected to said first reference voltage at a first end, a second end of said first diffusion layer and a first end of said second diffusion layer are connected to output said division voltage, a second end of said second diffusion layer is connected to said negative voltage, and said first well is connected to said negative voltage, and said second well is connected to a positive power supply voltage.

9. A negative voltage generating circuit comprising:

a reference voltage generating circuit for generating a reference voltage;

a voltage dividing circuit for dividing a voltage between said reference voltage and a negative voltage to produce a division voltage;

a comparing circuit for comparing a ground potential and a potential corresponding to said division voltage; and a negative voltage generating section for generating said negative voltage based on the comparing result to supply to said voltage dividing circuit, wherein said voltage dividing circuit and said comparing circuit are arranged on a substrate to be adjacent to each other, wherein a ground pattern of said reference voltage generating circuit and a ground pattern of said comparing circuit are connected to a common ground potential pad, wherein said voltage dividing circuit includes a first group of MOS transistors connected in series and a second group of MOS transistor circuits, said second group is connected to said first group in series, each of said MOS transistor circuits includes a first set of a first MOS transistor and a first switch which are connected in series, a second set of a second MOS transistor and a second switch which are connected in series, and a third set of a third switch, said first to third sets are connected in parallel, and wherein a first one of said MOS transistors of said first group is connected to said reference voltage and a last one of said sets of said second group is connected to said negative voltage.

10. A negative voltage generating circuit according to claim 9, wherein a mutual conductance of each of said MOS transistors in said first group is less than a mutual conductance of each of said second MOS transistors in said second group.

11. A negative voltage generating circuit according to claim 10, wherein a voltage between a source and drain of each of said second MOS transistors in said first second group is set to one-half of a voltage between a source and drain of each of said MOS transistors in said first group.

* * * * *